United States Patent [19]

Ahmed et al.

[11] Patent Number: 4,919,960

[45] Date of Patent: * Apr. 24, 1990

[54] PROCESS OF MAKING A CARBONATED LIQUID DAIRY PRODUCT

[75] Inventors: Salah H. Ahmed, Elk Grove Village; John D. Kadlec, North Aurora; Anthony J. Luksas, Downers Grove, all of Ill.

[73] Assignee: Dairy Research, Inc., Rosemont, Ill.

[*] Notice: The portion of the term of this patent subsequent to Feb. 14, 2006 has been disclaimed.

[21] Appl. No.: 248,742

[22] Filed: Sep. 26, 1988

Related U.S. Application Data

[63] Continuation-in-part of Ser. No. 94,304, Sep. 8, 1987, Pat. No. 4,804,552.

[51] Int. Cl.$^5$ .................... A23C 9/133; A23C 9/14; A23C 9/154
[52] U.S. Cl. .................... 426/580; 426/317; 426/477; 426/397; 426/615; 426/616
[58] Field of Search .............. 426/580, 317, 477, 397, 426/615, 616

[56] References Cited

U.S. PATENT DOCUMENTS

| | | | |
|---|---|---|---|
| 1,925,441 | 1/1927 | Finley et al. | 426/580 |
| 3,996,391 | 12/1976 | Inagami et al. | 426/580 |
| 4,676,988 | 6/1987 | Efstathiou et al. | 426/271 |
| 4,738,856 | 4/1988 | Clark | 426/590 |

*Primary Examiner*—Donald E. Czaja
*Assistant Examiner*—Helen Pratt
*Attorney, Agent, or Firm*—Griffin, Branigan & Butler

[57] ABSTRACT

There is provided a method of carbonating a liquid dairy product ot which another liquid food ingredient is added in admixture by heating the mixture to between 160° F. and 200° F. for 5 seconds to 30 minutes, to form a buffer of the indigenous ash of the liquid dairy product, cooling and carbonating the mixture to at least 1.5 volumes of carbon dioxide.

39 Claims, No Drawings

PROCESS OF MAKING A CARBONATED LIQUID DAIRY PRODUCT

This is a continuation-in-part of U.S. patent application Ser. No. 094,304, filed on Sept. 8, 1987, and entitled Carbonated Liquid Dairy Product and Method of Production Thereof now U.S. Pat. No. 4,804,552, issued on Feb. 14, 1989.

BACKGROUND OF THE INVENTION

In the aforenoted parent application, the entire disclosure of which is incorporated herein by reference and relied upon for present disclosure purposes, there is disclosed a method of carbonating a liquid dairy product to a high level of carbonation, while not destabilizing the liquid dairy product. The process includes heating the liquid dairy product to a temperature/time range of at least 160° F. for a time not in excess of 30 minutes to 200° F. for a time not in excess of 5 seconds, whereby by the indigenous dairy protein, and to some extent the indigenous ash, are at least partially denatured to form a buffer thereof. The at least partially denatured liquid dairy product is then cooled to a temperature of less than about 50° F. Thereafter, the cooled, denatured liquid dairy product is subjected to pressurized carbon dioxide at sufficient pressures and for a sufficient time such that the taste and mouth feel of the carbonated product is no longer that of the uncarbonated liquid dairy product, provided that at least 1.5 volumes of carbon dioxide are dissolved in the liquid dairy product during the carbonation step. The so carbonated liquid dairy product is then packaged in a closed container capable of substantially retaining the achieved degree of carbonation. The amount and extent of the heat denatured indigenous protein and ash in the dairy product is sufficient that the carbonated liquid dairy product is buffered to a pH of at least 4.0 and up to 5.7 and the carbonated liquid dairy product is highly carbonated but not destabilized.

The product which results from that process is a carbonated liquid dairy product comprising a liquid dairy product having at least partially heat denatured indigenous protein and ash therein and carbonated to at least 1.5 volumes of carbon dioxide, but wherein the amount and extent of the denatured protein and ash are sufficient that the carbonated product is buffered to a pH of at least 4.0 and up to 5.7, whereby the carbonated product is stable. The amount of carbon dioxide in the carbonated liquid dairy product is also sufficient such that the taste and mouth feel of the carbonated product is no longer that of the uncarbonated liquid dairy product.

The invention of that parent application is applicable to any liquid dairy product, including skim milk, whole milk, reduced fat content milk (e.g. 1% fat milk, 2% fat milk, etc.), cream, buttermilk, and whey, or the evaporated or condensed forms thereof, and it is particularly applicable to skim milk and whole milk, for dietary and taste reasons.

As explained in that parent application, for example, skim milk is subjected to a heat treating step where the temperature of the skim milk is raised to at least 160° F. At this temperature, the indigenous milk protein will commence to denature. The rate and extent of the denaturation will depend upon the temperature to which the skim milk is raised and the time at which the skim milk dwells at that temperature. It is important that the denaturation be allowed to proceed to an extent sufficient that the partially denatured skim milk will produce a sufficient quantity of denatured indigenous protein, and to some extent denatured indigenous ash, such that the denatured protein will form an effective buffer for the carbonated skim milk. On the other hand, the denaturation must not be allowed to proceed to the extent that a denatured protein flavor becomes significantly present in the denatured skim milk. This denatured protein flavor is commonly referred to in the art as a "cooked" taste and that taste is highly objectionable.

In the latter regard, the heat treating step may be carried out at temperatures as high as about 200° F. However, at this higher temperature, the allowable dwell time, i.e. without exceeding the maximum amount of denaturation which can be tolerated in order to avoid the "cooked" taste, is very short, e.g. about 5 seconds or less. Accordingly, the control of denaturation at these higher temperatures is difficult, and for this reason, it is preferred that the temperature of the heating step be no higher than 195° F., since at that temperature, the time of the heating step can be up to about 15 seconds, and that amount of dwell time allows more safety in the heating step in regard to avoiding excessive denaturation and the "cooked" flavor.

Between these two times and temperatures, i.e. 160° F. for no more than 30 minutes and 200° F. for no more than 5 seconds, there are a variety of temperatures and dwell times which will provide sufficient denaturation to achieve the required buffering of the carbonated skim milk but which will not cause excessive denaturation and a resulting "cooked" taste to the skim milk. Specific dwell times at specific chosen temperatures, however, depend, to some extent, on uncontrolled factors. Among these factors are the particular apparatuses used for conducting the heat treating step, the specific source of the skim milk (particularly the breed of cow and the history of the handling of the skim milk), the age of the skim milk, and the rate of temperature increase during the heating step. Accordingly, the specific temperature above 160° F. and below 200° F. that is chosen for the heat treating step must be conducted with sufficient numbers of tests at different dwell times to ensure that the amount of denaturation does not produce a "cooked" taste in the skim milk, but on the other hand is sufficient to buffer the carbonated skim milk to a pH of at least 4.0.

After the skim milk is heat treated and denatured, it is cooled to a temperature of less than 50° F. and more preferably to temperatures of about 40° F. or less. At temperatures above about 50° F., it is difficult to achieve the high level of carbonation required to effect the required taste and mouth feel change, due to the solubility characteristics of carbon dioxide in skim milk (or other liquid dairy products). The cooled and partially denatured skim milk is then subjected to pressurized carbon dioxide. This step may be carried out in any of the conventional beverage carbonators, e.g. those used for conventional carbonation of conventional flavored carbonated water beverages. However, irrespective of the particular apparatus being used, the pressure of the carbon dioxide used in the carbonation of the skim milk and the time for that carbonation must be such that the resulting carbonation reaches a level where the taste and mouth feel of the carbonated skim milk is no longer the taste and mouth feel of the uncarbonated skim milk. Here again, an empirical determination is quite easy to make, since when a sufficient amount of carbonation has taken place, that point can easily be detected by the taste and mouth feel change. Thus, it is only necessary to, with a series of tests, increase the degree of carbonation for any particular properly denatured liquid dairy product and taste the effect thereof. It will be quite apparent when sufficient carbonation has taken place, since at that point the taste and mouth feel will noticeably change from the taste and mouth feel of the uncarbonated skim milk.

However, it was found that for any liquid dairy product, the level of carbonation must be at least 1.5 volumes of carbon dioxide. Otherwise, for none of the liquid dairy products will the carbonation be sufficient to achieve the change in taste and mouth feel.

The products may be packaged in a very conventional manner, e.g. packaged in the manner of a conventional carbonated water beverage, e.g. packaged in pressure proof bottles and cans with conventional closures. This is an important feature of that invention and, indeed, makes the invention practical from a commercial point of view, as opposed to the processes and products of the prior art.

It is, however, preferred that the packaging take place with the carbonated skim milk being in a cooled condition, e.g. less than 50° F., and more preferably less than 40° F., for two reasons. First, while the present product does not experience the foaming of the prior art, it can occasion some slight degree of foaming, depending upon the particular heat treatment step, and packaging the cooled product substantially eliminates any difficulty in this regard. Secondly, since the present product is a dairy product, it must be protected from deterioration in the normal way, e.g. by refrigeration.

The carbonated skim milk should be handled in the same manner as natural skim milk. Thus, after carbonation, the carbonated skim milk should be stored, transported and handled in the same manner as any other liquid dairy product, which requires that the product always be maintained at a lower temperature. Generally speaking, therefore, the carbonated skim milk should be stored at a temperature below about 45° F., e.g. refrigeration temperatures.

The carbonated skim milk, with the changed taste and mouth feel, is particularly amenable to flavoring. A flavoring may be added anytime prior to packaging of the carbonated skim milk, but it is preferred that any flavoring be added after the denaturing step, since the heat treatment of the denaturing step can adversely affect some flavors. The specification of the parent application points out that the flavors can be chosen almost as desired, with the exception that the flavors should not produce substantial acidity in the flavored carbonated skim milk, since substantial acidity could overpower the buffering system and cause destabilization of the flavored carbonated skim milk. However, within this limitation, all of the usual flavors, such as a fruit flavor, a chocolate flavor, a vanilla flavor, a soft drink flavor, or a malt flavor, may be used without difficulty. The specification of the parent application also points out that the amount of the flavor used in the carbonated skim milk may be as desired, but amounts from about 0.1% to about 3% are usual concentration ranges.

BRIEF DESCRIPTION OF THE INVENTION

The present invention is based on the discoveries of certain modifications of the process described in the parent application which can provide a modified process which is amendable to producing a wider range of products and entirely new products.

These changes to the process, mainly, involve modifications of the feed to the process, which modifications of the feed to the process, in some embodiments, result in some changes in the manipulative steps of the process, as well as the conditions under which those steps are carried out.

As described above, the feed to the process of the parent application is a liquid dairy product which may be, among other things, skim milk, whole milk and the like. Also as described in the parent application, the process involves a heat treatment step wherein the protein and, to some extent, the ash naturally contained in the liquid dairy product is denatured to form a buffer in the liquid dairy product to be carbonated. That buffer is sufficient to buffer the carbonated liquid dairy product to a pH of 4.0 up to 5.7, whereby the carbonated liquid dairy product is stabilized. The present invention is based on the discovery that such denaturing of the liquid dairy product, with the resulting buffering system, is capable of allowing the inclusion in the carbonated product of other food compositions and still remain stable both during and after carbonation.

A further discovery in the present invention is that the process of the parent application, which, as described in the parent application, so changes the taste and mouth feel of the liquid dairy product, can have associated therewith other food compositions and ingredients, in a liquid state, which would ordinarily be assumed to be unacceptable, from a consumer point of view, such as vegetable and fruit juices. As a subsidiary discovery in this regard, it was found that even with highly acidic food compositions, such as fruit juices, the stabilization of the carbonated product, as taught in the parent application, still remained, and this was a most surprising discovery.

Thus, in the broader aspects of the invention, the present process differs from the process in the parent application in that instead of using only a liquid dairy product as a feed to the process, the present invention provides that the feed to the process need only be a composition containing a liquid dairy product, with the remainder of the composition being chosen from a wide variety of food ingredients, including the most surprisingly effective ingredients of juices. It is, however, still necessary that the composition to be carbonated contains a liquid dairy product in order to achieve the denaturing, buffering and stabilization taught by the parent application.

Thus, broadly stated, the present invention provides a method of carbonating a composition containing a liquid dairy product, to a high level of carbonation, while not destabilizing the composition. The process comprises heating the composition within a temperature/time range of at least 160° F. for a time not in excess of 30 minutes to 200° F. for a time not in excess of 5 seconds, and whereby the indigenous protein and ash in the liquid dairy product are at least partially denatured to form a buffer thereof. The denatured composition is cooled to a temperature of less than 50° F. and the cooled composition is subjected to pressurized carbon dioxide at sufficient pressures and for a sufficient time such that the taste and mouth feel of the composition has substantially no taste and mouth feel of the liquid dairy product contained in the composition. However, the carbonation must be to the extent that at least 1.5 volumes of carbon dioxide are dissolved in the carbonated composition. Thereafter, the carbonated composition is packaged in closed containers capable of retaining that degree of carbonation. Further, the amount and extent of the heat denatured protein and ash in the carbonated composition is sufficient that the composition is buffered to a pH of at least 4.0 and up to 5.7, and the carbonated composition is not destabilized.

The present invention also provides products which result from a such a process, which products are carbonated compositions containing a liquid dairy product, but where the compositions also contain a variety of other food ingredients, e.g. juices and the like.

DETAILED DESCRIPTION OF THE INVENTION

As noted above, in the broadest form of the present invention, the process is conducted in the same manner as described in the parent application with the exception of the composition to be carbonated. Thus, the details of the process in the parent application will not be repeated herein in connection with those broader aspects of the invention, and the entire disclosure of the parent application is referenced and relied for those details. The invention will, therefore, be described hereinafter, mainly, in terms of the modifications of the feed to the process of the parent application, i.e. the present composition containing a liquid dairy product, as opposed to the feed of the parent application which was only a liquid dairy product.

The present composition to be carbonated can include a wide variety of diverse liquid food ingredients. Surprisingly, these food ingredients may include fruit or vegetable juices. This is surprising not only in that the juices, which are normally quite acidic, do not destabilize the composition either prior to, during or after carbonization, but also result in a product which has an exceptionally pleasant taste, texture and mouth feel, which would be unexpected in a combination of a liquid dairy product and a juice. Thus, the composition to be carbonated can be a mixture of a liquid dairy product, e.g. skim milk, and one or more fruit and vegetable juices, e.g. grape juice, apple juice, apricot juice, peach juice, cranberry juice, and even the surprisingly acidic orange juice, or even more surprisingly the very acidic tomato juice. A carbonated combination of a liquid dairy product and a juice makes a surprisingly tasty breakfast-type drink, which is both pleasant to taste, quite filling, and most nutritious. For example, the combination of carbonated skim milk and orange juice provides a very refreshing taste, which is most surprising, and also a variety of nutritional components, e.g. protein, minerals, fat and vitamins (from the skim milk), fiber, fructose, and other vitamins (from the orange juice).

The buffering system produced in situ by the process, as described in the parent application, is capable of stabilizing these diverse juices with their usual acidic character, and allowing that combination to be successfully carbonated, stored, shipped and consumed without destabilization, which is a surprising discovery. However, the amount of such juices which can be contained in the composition to be carbonated is limited, since if too much of such juices, especially the more acidic juices, are contained in the composition to be carbonated, the buffering system produced in situ by the process will be overpowered and destabilization will occur. Thus, when using the less acidic juices, the amount of juice contained in the composition to the carbonated should be about 40% or less, but with the more acidic juices, such as orange juice, the amount of juice contained in the composition to be carbonated should be about 20% or less. With even more acidic juices, such as tomato juice, the amount of juice in the composition to be carbonated should be about 10% or less. Within these ranges, for particular juices, only a limited number of experiments will be required to determine the upper amount of juices which can be contained in the composition to be carbonated, without overpowering the buffering system produced by the process, with the resulting destabilization. However, there are means of achieving higher levels of juices which will not overpower the buffering system, as described hereinafter.

Also, while not preferred, the liquid dairy product may be carbonated in the manner described in the parent application and after carbonation, but before packaging, may be simply mixed with a fruit or vegetable juice. When this procedure is used, the same ranges of juice contents in the mixtures should also be observed, i.e. about 40% or less for less acidic juices, about 20% or less for intermediate acidic juices, and about 10% or less for highly acidic juices.

As another embodiment of the invention, the composition to be carbonated can be modified to include an imitation milk. Imitation milks are known to the art and are, essentially, emulsions of a milk protein, butter fat or vegetable fat, emulsifiers and stabilizers. It has been found that the milk protein used in these imitation milks are sufficient to achieve the required denaturization and stabilization described in the parent application, at least for many systems. Thus, instead of the composition to be carbonated being only a liquid dairy product, as described in the parent application, the composition to be carbonated may be at least in part a conventional imitation milk and, for some purposes, the composition to be carbonated may be entirely an imitation milk. The purpose of using an imitation milk, is that the carbonated product which results will be essentially free of lactose. There are significant numbers of people who have a lactose intolerance, and they cannot safely consume the carbonated product of the parent application. However, by using an imitation milk, as the composition to be carbonated, a very pleasant tasting beverage, similar to the beverage of the parent application, can be produced which will be essentially free of lactose. However, lactose can be removed from the composition, in the manner described hereinafter, to produce the same result.

As another embodiment of a modification of the composition to be carbonated, instead of using a liquid dairy product, per se, the liquid dairy product in the composition may be a reconstituted form of a composition base. That base can be prepared from dried or concentrated forms of liquid dairy products, e.g. evaporated milk, freeze-concentrated milk, non-fat dry milk solids, and the like. The dried or concentrated forms of the liquid dairy product, e.g. non-fat dry milk solids, are dissolved in a food-grade liquid solvent, so as to produce a concentrated base for carbonation purposes. That base may contain colors, flavors and the like, and can be packaged, for example, in cans. Those cans can be manufactured at one point and sent to a distant point for reconstitution and carbonation, much in the same manner as the base for soft drinks are packaged in a manufacturing plant and sent to a bottling plant for reconstitution and carbonation. This allows efficiencies in manufacture of the carbonated beverage, in the same manner of the efficiencies of manufacture with ordinary soft drinks.

Thus, in a distant plant from the plant of manufacture of the base, the base is simply reconstituted with water and carbonated according to the process of the parent application. Alternatively, the base can be prepared such that the dried or concentrated liquid dairy product has already experienced the heat denaturization required for achieving the buffer, along with the intended stabilization, as described in the parent application, and such a base may be transported to a distant plant, where the base is simply mixed with carbonated water, in the manner of a conventional bottling plant, to provide the carbonated beverage.

As an example, the base may be non-fat dry milk solid dissolved in a food-qrade liquid solvent, such as water, along with any desired flavors, including juices, juice powders and concentrated juices, and the like. However, it has been found that when the liquid solvent of the base is water, then the solids content of the base, e.g. the non-fat dry milk solids, can be up to only about 36% (at room temperature), since at concentrations of the solids in the base beyond that amount can cause lactose to separate and precipitate as a solid precipitate. The precipitated lactose is very difficult to redissolve or even redisperse, and the solid precipitated lactose can cause considerable problems in ordinary carbonation equipment.

The base may include any of the usual flavors, such as a fruit flavor (natural or artificial), vegetable flavor, chocolate flavor, vanilla flavor, and any of the usual soft drink flavors, such as the cola flavor, the ginger ale flavor, etc., or a traditional malt flavor.

As noted above, the dry or condensed form of the liquid dairy product may be treated so that the base formed thereof has been denatured for stabilization purposes in the manner described in the parent application. With such, the base can then be used in conventional carbonators for producing carbonated beverages, where simply the base is mixed with already carbonated water. Thus, for example, non-fat dry milk solids may be used in producing the base, for the above-noted purpose, when those non-fat dry milk solids have been heat treated and wherein that heat treatment has been within the range of the temperature/time range described in the parent application, and described above, i.e. at least 160° F. for a time not in excess of 30 minutes to 200° F. for a time not in excess of 5 seconds. However, in the usual production of non-fat dry milk solids, heat treatment within this range which is sufficient to provide the required denaturization for stabilization purposes is not ordinarily experienced, at least by most of the non-fat dry milk solids being processed. However, in carrying out the process for producing the non-fat dry milk solids, for example, that process could be conducted at temperatures and times within the above temperature/time range sufficient to achieve the denaturization of the protein for producing the required buffer and stabilization. If such is observed, then such non-fat dry milk solids may be used in forming the base, and the base may be simply mixed with carbonated water, for producing the carbonated beverage, as described above.

Alternatively, commercially produced non-fat dry milk solids may simply be dispersed in water and the water dispersion of those solids then heat treated to the temperature/time range described above sufficient to achieve the required denaturization of the protein and ash, for stabilization purposes, so as to form the required buffer. Thereafter, the denatured composition is dried to the denatured non-fat dry milk solids, and those solids can then be used in preparing the base and that base can then be used in conventional carbonation machines where only the base and precarbonated water are mixed.

Alternatively, non-fat dry milk solids for inclusion in the base can be prepared by heat treating skim milk in the temperature/time range described above to achieve the required denaturization of the protein and ash, for stabilization and buffering purposes, and then drying that heat treated skim milk to non-fat dry milk solids. These solids can then be incorporated in the base for the purposes described above.

In any of these alternatives, however, the heat treatment of the non-fat dry milk solids must be sufficient to cause the required at least partial denaturization of the protein and ash and form the required buffer. When this is achieved, as will be quite apparent, it is no longer necessary to carry out the heating step described in the parent application and described above, and that heating step can be eliminated from the process. With the elimination of that step of the process, the process for carbonating the present composition becomes a process which is essentially the same as the process of carbonating soft drink beverages, i.e. mixing the base with the denatured protein and ash already therein, with precarbonated water.

Alternative to a dry or concentrated base, the composition of the present process may be a reconstituted form of a composition base where the base is dispersed, as opposed to being dissolved, in a foodgrade liquid carrier. Again, that base, for example, may contain non-fat dry milk solids. In this embodiment, the carrier need not be a solvent for the dairy product being used, e.g. non-fat dry milk solids, but only need be food grade and capable of dispersing that dairy product. Thus, the carrier can be alcohol, glycerine or even fats, but it is preferred that the carrier be water. In this embodiment, the dairy product, e.g. non-fat dry milk solids, is contained in the carrier in an amount sufficient to form a paste. The paste is very conveniently formed by milling the solids into the carrier, by use of conventional milling machinery. This base, in paste form, likewise may contain one or more flavors and/or sugar and like ingredients.

In the embodiment of the paste base, as described in connection with the embodiment of the dissolved base, the dairy product, e.g. non-fat dry milk solids, can have a prior heat treatment, as described above, so that sufficient denaturization and buffering is achieved. In this embodiment, therefore, the paste can be used in the same manner as the dissolved base described above for carbonating the paste with precarbonated water. However, in both the embodiment of the base being a dissolved base and the embodiment of the base being a dispersed base, e.g. a paste, it is not necessary for the dairy product of the base to have a prior heat treatment, so as to achieve the required denaturization and buffering, and either the dissolved base or the dispersed base may be simply reconstituted and used in the process described in the parent application and described above. For example, either the dissolved base or the dispersed base can be reconstituted with water or skim milk or any other liquid dairy product and used in the manner described in the parent application and described above.

However, for example, if either one of the bases are reconstituted with water, as will be appreciated, that reconstitution may be such that the solids content of the composition derived from the liquid dairy product is reduced. In effect, therefore, the composition to be carbonated is in part diluted with water to provide a reduced solids content of the liquid dairy product. As can be appreciated, the reduced solids content of the liquid dairy product will likewise reduce the amount of denatured protein and ash and, hence, reduce the amount of buffering involved. On the other hand, that reduced solids content also reduces other components of the liquid dairy product which may not be desired. For example, this embodiment may be used to reduce the lactose content, for lactose-intolerant persons, as described above, or, for example, when the liquid dairy product is whole milk, or a dried or condensed form thereof, such dilutions will reduce the amount of fat in the ultimate carbonated product. Indeed, the composition to be carbonated may be any one of the liquid dairy products described in the parent application which has been simply diluted with water to, accordingly, reduce the amount of a component in the carbonated product, e.g. reduce the amount of lactose, fat, etc.

However, in such cases of dilution, as noted above, the amount of denatured protein and ash will be reduced and the degree of carbonization may also have to be reduced to the lower ranges described above in order to avoid destabilization of the carbonated product. However, it has been found that the composition to be carbonated may have solid contents derived from the liquid dairy product which are one-half of the solids content of the liquid dairy product prior to such dilution and sufficient stabilization still results, especially at lower carbonation levels within the range described above.

However, there are other means of reducing the content of a naturally occurring component of the liquid dairy product in the carbonated composition. Indeed, there are means of essentially removing altogether a naturally occurring component of the liquid dairy product. For example, and for the reasons expressed above, the naturally occurring component of the liquid dairy product to be removed may be lactose. Thus, the liquid dairy product may be subjected to ultrafiltration or concentration to remove lactose therefrom prior to incorporation into the composition to be carbonated. Such processes can easily remove at least 20% and up to 90% of the lactose.

As another embodiment of a modification of the composition to be carbonated, that composition may be a reconstituted form of a dry mix. In such a dry mix, additional functional ingredients may be included. For example, the dry mix may contain a calcium complexing or a chelating agent. That dry mix is then reconstituted with a liquid dairy product, for example skim milk or skim milk diluted with water, for the dilution reasons explained above. That reconstituted form of the dry mix can then be heated, e.g. to about 100° F. to 150° F. for about 1 to 20 minutes, and the complexing agent or chelating agent will form a complex or chelate with the calcium in the liquid dairy product. By either complexing or chelating the calcium, the resulting composition is stabilized for carbonation purposes beyond the stability achieved through the denaturization of the protein and ash in the liquid dairy product, as described in the parent application and as described above. This additional stabilization is very important when it is desired to add significant amounts of acidic substances to the composition to be carbonated, e.g. highly acidic fruit juices or vegetable juices, as also discussed above. As is known in the art, the calcium ions are destabilized in the presence of acidic substances, i.e. resulting in lower pHs, and the composition containing the calcium ions and highly acidic substances, such as juices, can therefore become destabilized.

Such dry mixes may also include additional stabilizers, for incorporating an even greater amount of juices and the like, such as pectin or natural gums. These stabilizers, however, need not be added to the dry mix but could be added to the composition for carbonation prior to or during the above-described heating step for forming a complex or chelate with the calcium ions in the liquid dairy product.

With such additional stabilization, either by way of the complexing or chelating agents, or by way of additional added stabilizers, such as pectins and gums, the amount of even highly acidic juices, which can be added to the composition for carbonation, can be substantially increased, e.g. up to about 40%. In addition, with such increased stabilization, the pH of the composition to be carbonated can be adjusted to lower pHs which provide pHs more normally associated with such juices, e.g. the pH of such a mixture can be adjusted to a pH of less than 3.8, while still remaining stable. This is a most surprising and unexpected result of the present invention and, indeed, allows the production of a very novel and nutritious carbonated beverage. As can be appreciated, a breakfast-type drink can therefore be prepared which is a combination of a liquid dairy product, e.g. skim milk, and up to 40% of a juice, for example orange juice. The resulting product is highly flavored by the orange juice and tastes very similar to orange juice, with the exception of the carbonation flavor, but yet at the same time, provides the substantial added nutrition of the liquid dairy product, e.g. skim milk. Such a product is substantially different from any product heretofore available and provides a very substantial advance in the art, and is, hence, a preferred form of the present invention.

In addition to or in lieu of the further stabilization with complexing agents, chelating agents and stabilizers, known processes can be conducted on either the liquid dairy product, e.g. milk or skim milk, and on the juices, e.g. orange juice, for demineralizing both the liquid dairy product and the juice. U.S. Pat. No. 4,676,988 is representative of such processes, and the entire disclosure of that patent is incorporated herein by reference and relied upon for the details of that process. However, basically, the milk is treated with a cation exchange resin and then with an anion exchange resin. The milk can be concentrated by, among others, ultrafiltration either prior to or subsequent to such treatment. The juice is treated with a cation exchange resin and then with an anion exchange resin. The separately prepared milk and juice, which may be adjusted in pH by adding acids or bases, are then blended and that blend is more stable than such a blend without such pretreatment. Such a blend can then be carbonated according to the process of the parent application and as described above to achieve the further stabilization by denaturization of the protein and ash of the milk and, hence, allow the higher carbonation and the higher amounts of juices for present purposes. However, this considerably complicates the process for producing a carbonated composition with higher amounts of juices, and is therefore not a preferred form of the process.

The invention will now be illustrated by way of a specific example to a preferred embodiment of the invention. In the example, as well as in the specification and claims, all percentages, parts and proportions are by weight, unless otherwise indicated.

EXAMPLE

This example produces a highly nutritional breakfast beverage containing both a liquid dairy product and a high amount of a fruit juice.

A dry mix is first prepared containing about 9% sugar, 0.3% sodium citrate, and about 0.35% pectin.

To this dry mix was added 20% of skim milk and 60% of water, along with 5% of citric acid. After thoroughly mixing the dry ingredients into the fluid mixture of milk, water and citric acid, the resulting mixture was heated to about 110° F. for about 15 minutes. During this heating step, the citric acid complexed with the calcium ions of the skim milk to form a citrate thereof and at the same time the pectin stabilized the system from which the calcium had been removed.

After cooling, 20% of orange juice was added thereto. Thus, the liquid portion of the resulting composition was about 20% skim milk, 20% orange juice and about 60% water. Of the total composition, the sugar was about 9%, the sodium citrate (now reacted with calcium) was about 0.3%, and the pectin was about 0.35%.

The pH of the mixture was then adjusted to below the isoelectric point of the mixture, i.e. to a pH of about 3.8.

This mixture was then heated to about 163° F. for bout 15 seconds in a short-time-high-temperature pasteurizing apparatus to denature the indigenous dairy protein and ash and then quickly cooled to about 140° F.

The resulting cooled mix was then carbonated as follows. The mix was placed in a Zahm and Nagel Carbonator leaving about 20% headspace. The temperature of the mix in the carbonator was adjusted to 40° F., plus or minus 2° F. Carbon dioxide was fed to the carbonator via the dip tube (opening near the bottom of the carbonator) to a pressure of 13 psi and held at that pressure with a continuous bleed of the headspace for 15 minutes, during which time unwanted dissolved air in the mix and air in the headspace were liberated from the mix and headspace and allowed to escape via the bleed of carbon dioxide. Thereafter, the bleed was discontinued and the carbon dioxide pressure was raised to about 23 psi and held at that pressure for about 20 minutes, during which the mix was agitated to ensure good carbonation, while maintaining the 40° F. temperature, plus or minus 2° F. The so carbonated beverage was then packaged in 10 ounce bottles, immediately capped and stored until testing by a Taste Panel at refrigeration temperature (approximately 38° F.).

When tested by the Taste Panel, the carbonated beverage had a very distinctive orange flavor, but with a light and lively mouth feel. No residual background flavor of the skim milk was noticeable and the product was completely stable, with no evidence of any precipitation.

When the bottle was uncapped, the contents did not spew from the bottle, even when slightly shaken, and when the contents was poured into a glass for tasting purposes, an eye appealing foamy froth occurred at the surface of the product in the glass.

The Taste Panel judged the product to be an excellent breakfast beverage.

The above example illustrates a preferred embodiment of the present invention. However, since orange juice is used in that product, with prolonged storage some of the pulp of the orange juice can settle to the bottom of the container. When long term storage of the beverage is contemplated, it is therefore preferable to homogenize the composition prior to carbonization so as to minimize any settling of the pulp of the orange juice in the container.

Also, while that example shows the use of 20% juice, e.g. orange juice, it has been found that with the process of that example, up to 40% orange juice can be used in the composition to be carbonated, and with as little as 10% orange juice, a very pleasant orange flavor is still imparted to the composition. Likewise, while 20% of skim milk was used in that example, the skim milk can vary between about 10 and 40%. 10% of skim milk still provides sufficient denaturization and buffering for stabilization purposes when used in conjunction with the complexing (or chelating) agent, while up to 40% of skim milk will not produce any noticeable dairy product background flavors. With these broader ranges of juice and milk, correspondingly, the amount of water added will be reduced. However, it has been found that the composition to be carbonated should contain at least about 40% water in order to not overpower the buffering system.

It will be apparent from the foregoing, that those skilled in the art will immediately recognize modifications of the above-described specific embodiments, and those modifications are intended to be encompassed by the spirit and scope of the annexed claims.

What is claimed is:

1. A method for carbonating a composition containing a liquid dairy product, to a high level of carbonation, while not destabilizing the composition, comprising:
   (1) heating a composition containing a liquid dairy product within a temperature/time range of at least 160° F. for a time not in excess of 30 minutes to 200° F. for a time not in excess of 5 seconds and whereby the indigenous protein and ash in the liquid dairy product are at least partially denatured to form a buffer thereof;
   (2) cooling the denatured composition to a temperature of less than 50° F.;
   (3) subjecting the cooled composition to pressurized carbon dioxide at sufficient pressures and for a sufficient time such that the taste and mouth feel of the composition has substantially no taste and mouth feel of the liquid dairy product contained in the composition, provided that at least 1.5 volumes of carbon dioxide are dissolved in the carbonated composition;
   (4) before, during or after either of steps 1, 2 or 3, adding to said composition an other liquid food ingredient; and
   (5) packaging the carbonated composition in closed containers capable of retaining the said degree of carbonation;
and wherein the amount and extent of the heat denatured protein and ash in the carbonated composition is sufficient that the composition is buffered to a pH of at least about 3.8 and up to 5.7 and the carbonated composition is not destabilized.

2. The process of claim 1 wherein the composition prior to carbonation contains a fruit or vegetable juice.

3. The process of claim 1 wherein after carbonation the carbonated composition is mixed with a fruit or vegetable juice.

4. The process of claim 2 wherein the amount of juice in the composition is about 40% or less.

5. The process of claim 3 wherein the amount of juice mixed with the carbonated composition is 40% or less.

6. The process of claim 4 wherein the amount of juice is about 20% or less.

7. The process of claim 6 wherein the amount of juice is about 10% or less.

8. The process of claim 5 wherein the amount of juice is 20% or less.

9. The process of claim 8 wherein the amount of juice is 10% or less.

10. The process of claim 1 wherein the liquid dairy product in the composition is at least in part an imitation milk.

11. The process of claim 1 wherein the liquid dairy product is a reconstituted form of a composition base, said base having non-fat dry milk solids dissolved in a food grade liquid solvent.

12. The process of claim 11 wherein the liquid solvent of the base is water and the said dry milk solids content of the base is up to about 36%.

13. The process of claim 12 wherein the base contains a flavor.

14. The process of claim 13 wherein the flavor is a fruit flavor, vegetable flavor, chocolate flavor, vanilla flavor, soft drink flavor or malt flavor.

15. The process of claim 11 wherein the non-fat dry milk solids are heat treated non-fat dry milk solids, wherein said heat treatment is within the said temperature/time range.

16. The process of claim 15 wherein the heat treatment is carried out while the non-fat dry milk solids are dispersed in water, and after said heat treatment the treated said solids are dried to dry solids.

17. The process of claim 15 wherein the heat treated non-fat milk solids are prepared by heat treating skim milk within the said temperature/time range and drying the skim milk to non-fat dry milk solids.

18. The process of claim 15 wherein the heat treatment of the non-fat dry milk solid is sufficient to cause said at least partial denaturization of the protein and ash and form said buffer in the composition and said heating step of the said process is eliminated.

19. The process of claim 17 wherein the heat treatment of the skim milk is sufficient to cause said at least partial denaturization of the protein and ash and form said buffer in the composition and said heating step of the said process is eliminated.

20. The process of claim 1 wherein the composition is a reconstituted form of a composition base, said base having non-fat milk solids dispersed in a food grade liquid carrier.

21. The process of claim 20 wherein the carrier is water and the said solids are contained in said carrier in amounts sufficient to form a paste.

22. The process of claim 21 wherein the paste is formed by milling the said solids into the said carrier.

23. The process of claim 21 wherein the carrier is water.

24. The process of claim 20 wherein the base contains one or more of flavors and sugar.

25. The process of claim 1 wherein the composition, in part, is diluted with water so that the solids content of the composition derived from the liquid dairy product is reduced.

26. The process of claim 25 wherein the composition has solids contents derived from the liquid dairy product which are one-half of the solids content of the liquid dairy product prior to said dilution.

27. The process of claim 1 wherein the liquid dairy product has at least one naturally occurring component thereof either reduced or removed therefrom.

28. The process of claim 27 wherein the component is lactose.

29. The process of claim 28 wherein the liquid dairy product is subjected to ultrafiltration or freeze concentration to remove lactose therefrom prior to incorporation with the composition.

30. The process of claim 29 wherein at least 20% and up to 90% of the lactose is removed.

31. The process of claim 1 wherein the composition is a reconstituted form of a dry mix.

32. The process of claim 31 wherein the dry mix contains a calcium complexing or chelating agent.

33. The process of claim 32 wherein the dry mix is reconstituted with a liquid dairy product.

34. The process of claim 33 wherein the liquid dairy product is diluted with water.

35. The process of claim 34 wherein the reconstituted composition form is heated to about 100° F. to 150° F. for about 1 to 20 minutes whereby the complexing agent or chelating agent forms a complex or chelate with the calcium in the liquid dairy product.

36. The process of claim 35 wherein a stabilizer for the composition is added prior to or during said heating step.

37. The process of claim 36 wherein the stabilizer is pectin or a natural gum.

38. The process of claim 35 wherein a vegetable or fruit juice is added after said heating step to form a mixture thereof.

39. The process of claim 38 wherein the pH of the mixture is adjusted to a pH of less than 3.8.

* * * * *